(12) United States Patent
Yan et al.

(10) Patent No.: US 7,974,978 B2
(45) Date of Patent: Jul. 5, 2011

(54) SYSTEM AND METHOD FOR GRAPH INDEXING

(75) Inventors: Xifeng Yan, Urbana, IL (US); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 2051 days.

(21) Appl. No.: 10/835,729

(22) Filed: Apr. 30, 2004

(65) Prior Publication Data
US 2006/0036564 A1 Feb. 16, 2006

(51) Int. Cl.
G06F 17/30 (2006.01)
(52) U.S. Cl. .......................... 707/741; 705/10
(58) Field of Classification Search ...... 707/1, 697–700, 707/713–717, 736–747, 830; 705/8–10
See application file for complete search history.

(56) References Cited

U.S. PATENT DOCUMENTS

| 2003/0225743 A1* | 12/2003 | Inokuchi | 707/3 |
| 2004/0059731 A1* | 3/2004 | Yianilos et al. | 707/5 |
| 2006/0074858 A1* | 4/2006 | Etzold et al. | 707/3 |

OTHER PUBLICATIONS

Yan et al., "CloseGraph: Mining Closed Frequent Graph Patterns," SIGKDD '03.
Cooper et al., "A Fast Index for Semistructured Data," Proceedings of the 27th VLDB Conference, Roma, Italy (2001).
Goldman et al., "DataGuides: Enabling Query Formulation and Optimization in Semistructured Databases," Proceedings of the 23rd VLDB Conference, Athens, Greece (1997).
Kaushik et al., "Exploiting Local Similarity for Indexing Paths in Graph-Structured Data," ICDE '02.
Kuramochi et al., "Frequent Subgraph Discovery," ICDM '01.
Milo et al., "Index Structures for Path Expressions," *Lecture Notes in Computer Science*, 1540:277-295 (1999).
Chen et al., "D(K)-Index: An Adaptive Structural Summary for Graph-Structured Data,"SIGMOD '03.
Shasha et al., "Algorithmics and Applications of Tree and Graph Searching," PODS '02.
Chung et al., "APEX: An Adaptive Path Index for XML data," SIGMOD '02.

* cited by examiner

*Primary Examiner* — Wilson Lee
(74) *Attorney, Agent, or Firm* — Ryan, Mason & Lewis, LLP (57) ABSTRACT

Techniques for graph indexing are provided. In one aspect, a method for indexing graphs in a database, the graphs comprising graphic data, comprises the following steps. Frequent subgraphs among one or more of the graphs in the database are identified, the frequent subgraphs appearing in at least a threshold number of the graphs in the database. One or more of the frequent subgraphs are used to create an index of the graphs in the database.

20 Claims, 9 Drawing Sheets

FIG. 3
A SAMPLE DATABASE

FIG. 4
FREQUENT SUBGRAPHS

FIG. 5
SIZE-INCREASING SUPPORT FUNCTIONS

FIG. 6

DISCRIMINATIVE SUBGRAPHS

FIG. 7

| featureSelection |
|---|
| Input: Graph database $D$, Discriminative ratio $\gamma_{min}$,<br>Size-increasing support function $\psi(l)$,<br>Maximum Subgraph size $maxL$.<br>Output: Feature set $F$.<br><br>1:   let $F = \{f\phi\}$, $D_{f_\phi} = D$, and $l = 0$;<br>2:   while $l \leq maxL$ do<br>3:     for each Subgraph $x$, whose size is $l$ do<br>4:       if $x$ is frequent and discriminative (<br>    $support(x) \geq \psi(len(x))$ and $|\cap_i D_{f_{\varphi_i}}|/|D_x| \geq \gamma_{min}$,<br>    for $f_{\varphi_i} \subseteq x$.) then<br>5:         $F = F \cup \{x\}$;<br>6:     $l = l + 1$;<br>7:   return $F$; |

FIG. 8
DFS CODE GENERATION

FIG. 9
gIndex TREE

A SAMPLE QUERY

FIG. 12

| SEARCH |
|---|
| Input: Graph database $D$, Feature set $F$, Query $q$ and Maximum Subgraph size $maxL$.<br>Output: Candidate answer set $C_q$.<br><br>1: let $C_q = D$ and $l = 0$;<br>2: for each Subgraph $x \subseteq q$ and $len(x) \leq maxL$ do<br>3:     if $x \in F$ then<br>4:         $C_q = C_q \cap D_x$;<br>5: return $C_q$; |

FIG. 13

| INSERT/DELETE |
|---|
| Input: Graph database $D$, Feature set $F$,<br>       Inserted (Deleted) graph $g$ and its id $gid$,<br>       Maximum Subgraph size $maxL$.<br><br>1: for each Subgraph $x \subseteq g$ and $len(x) \leq maxL$ do<br>2:     if $x \in F$ then<br>3:         Insert:<br>            insert $gid$ into the id list of $x$;<br>4:         Delete:<br>            delete $gid$ from the id list of $x$;<br>5: return; |

FIG. 14

INDEX SIZE

FIG. 15

LOW SUPPORT QUERIES

FIG. 16

HIGH SUPPORT QUERIES

FIG. 17

PERFORMANCE ON THE CHEMICAL DATA

INCREMENTAL MAINTENANCE

FIG. 21

PERFORMANCE ON A SYNTHETIC DATASET

SYSTEM AND METHOD FOR GRAPH INDEXING

FIELD OF THE INVENTION

The present invention relates to data mining and, more particularly, to techniques for graph indexing.

BACKGROUND OF THE INVENTION

Graphs have become increasingly important in modeling complicated structures such as proteins (i.e., bioinformatics), chemical compounds (i.e., chemical informatics), circuits and schema-less data (e.g., data relating to images and extensible markup language (XML) documents). Essentially, any kind of data can be represented by a graph. For example, graphs are used in computer vision applications to represent complex relationships, such as the organization of entities in an image, to identify objects and to identify scenes.

In chemical informatics, graphs are used to represent chemical compounds. For example, Daylight 4.82, a product of Daylight Chemical Information Systems, Inc., uses graphs to perform screening, designing and knowledge discovery from a particular chemical compound(s) or from molecular databases.

Efficiency in processing graph queries and retrieving related graphs, however, is critical for the success of many graph related applications. For example, a query may center on finding all graphs in database $D=\{g_1, g_2, \ldots, g_n\}$ which contain a subgraph, q. Performing a sequential scan on D and checking each graph for q would be inefficient.

Several techniques have been developed to eliminate the need for performing a sequential scan. For example, various indexing methods have been developed to process XML queries, a simple kind of graph query built around path expressions. See, for example, R. Goldman et al., *Dataguides: Enabling Query Formulation and Optimization in Semistructured Data*, VLDB'97, Proceedings of 23rd International Conference on Very Large Data Bases; T. Milo et al., *Index Structures for Path Expressions*, LECTURE NOTES IN COMPUTER SCIENCE, 1540:277-295 (1999); B. Cooper et al., *A Fast Index for Semistructured Data*, VLDB Conference (2001); R. Kaushik et al., *Exploiting Local Similarity for Efficient Indexing of Paths in Graph Structured Data*, ICDE (2002); J. Min et al., *Apex: An Adaptive Path Index for XML Data*, SIGMOD (2002); D. Shasha et al., *Algorithmics and Applications of Tree and Graph Searching*, PODS (2002) (hereinafter "Shasha"); Q. Chen et al., *D(k)-index: An Adaptive Structural Summary for Graph-Structured Data*, SIGMOD (2003).

The above indexing techniques break each query down into paths, search each path separately for the graphs containing the path and join the results. These methods take the path as the basic indexing unit and therefore are suited for path expressions and tree-structured data. Path-based indexing methods, however, have notable disadvantages. First, information may be lost when breaking queries down into paths. As a result, it is likely that numerous false positive answers will be returned. Path-based indexing methods are therefore not suitable for complex graph queries. Further, since path-based methods focus on individual paths, as mentioned above, the number of paths present in a typical database would make path-based indexing largely impractical (paths may be compressed, but that typically leads to increased numbers of false positives generated).

Therefore, indexing techniques are needed for performing accurate and efficient graph queries.

SUMMARY OF THE INVENTION

The present invention provides techniques for graph indexing. In one aspect of the invention, a method for indexing graphs in a database, the graphs comprising graphic data, comprises the following steps. Frequent subgraphs among one or more of the graphs in the database are identified, the frequent subgraphs appearing in at least a threshold number of the graphs in the database. One or more of the frequent subgraphs are used to create an index of the graphs in the database.

A more complete understanding of the present invention, as well as further features and advantages of the present invention, will be obtained by reference to the following detailed description and drawings.

DETAILED DESCRIPTION OF PREFERRED EMBODIMENTS

Figure 1:
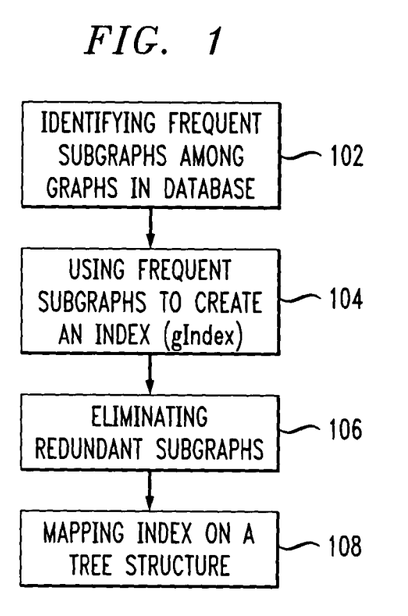
FIG. 1 is a diagram illustrating an exemplary methodology for indexing graphs according to an embodiment of the present invention.

FIG. 1 is a diagram illustrating an exemplary methodology for indexing graphs. In step 102 of FIG. 1, frequent subgraphs are identified among the graphs in a database of graphs. The term "graph" is intended to broadly include, but not be limited to, any form of data comprising one or more features, such as, graph data sets, images, sequences and combinations comprising at least one of the foregoing data forms.

Graphs are used to model complicated structures and schema-less data. In a graph, the vertices and edges represent the entities and relationships, respectively. The attributes associated with entities and relationships are called labels. Both directed graphs, such as extensible markup language (XML), and undirected graphs, such as chemical structural formulas, as will be described below, are common graph forms used to represent data.

As a notational convention, the vertex set of a graph g is denoted by $V(g)$, the edge set by $E(g)$ and the size of a graph by $len(g)$ (which is defined by $|E(g)|$, as in the present techniques). A label function l maps a vertex, or an edge, to a label.

The term "subgraph" denotes any subset or fragment of a graph. Therefore, in equations appearing herein, the term "subgraph" is represented by the symbol f as being synonymous with the term "fragment." A particular graph g is a subgraph of another graph g' if there exists a subgraph isomorphism from g to g', denoted by $g \subseteq g'$. g' is called a supergraph of g. A subgraph isomorphism is an injection function, e.g., $f:V(g) \rightarrow V(g')$, wherein: $\forall u \in V(g)$, $l(u)=l'(f(u))$, $\forall (u,v) \in E(g)$, $(f(u), f(v)) \in E(g')$ and $l(u,v)=l'(f(u), f(v))$, and wherein l and l' are the label function of g and g', respectively. f is called an embedding of g in g'.

Further, as will be described in detail below, frequent subgraphs are those subgraphs that appear in at least a threshold number of graphs in the database. Identifying frequent subgraphs, including determining the threshold number, will be described in detail below.

In step 104 of FIG. 1, the frequent subgraphs are used to create an index. In an exemplary embodiment, an index is constructed by enumerating and selecting features in a graph database D to form a graph feature set F. A graph without any vertex and edge is denoted by $f_\phi$, $f_\phi$ is viewed as a special feature, which is a subgraph of any graph. For completeness, F should include $f_\phi$. For any graph feature, $f \in F$, $D_f$ is the set of graphs containing f, $D_f = \{g_i | f \subseteq g_i, g_i \in D\}$. The use of frequent subgraphs to create an index, e.g., the gIndex, will be described in detail below.

In step 106 of FIG. 1, redundant subgraphs are eliminated. Redundant subgraphs will be described in detail below. In step 108 of FIG. 1, the index can be mapped on a tree structure. Mapping the index on a tree structure will also be described in detail below.

Figure 2:
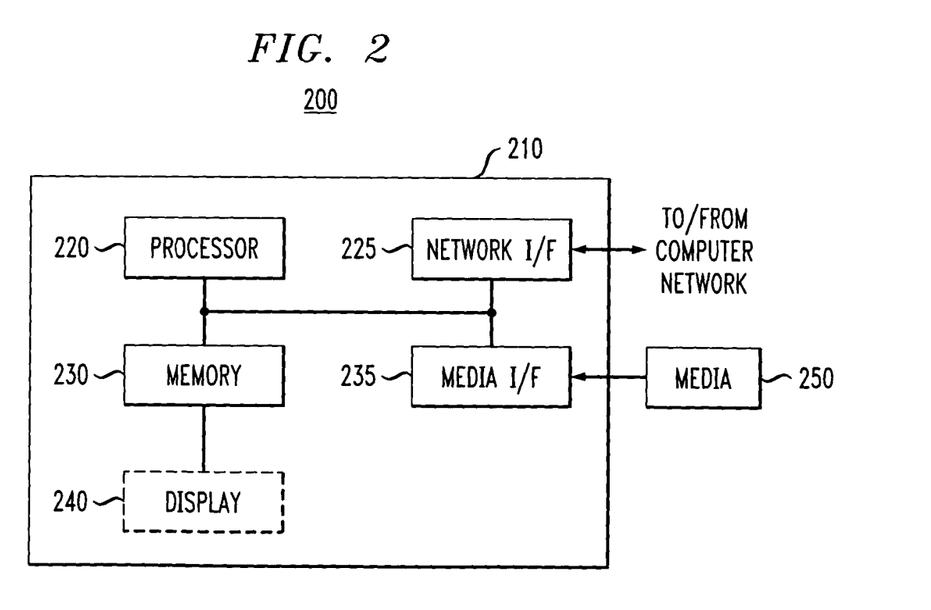
FIG. 2 is a diagram illustrating an exemplary system for implementing one or more of the present techniques according to an embodiment of the present invention.

FIG. 2 is a block diagram of an exemplary hardware implementation of one or more of the methodologies of the present invention. Apparatus 200 comprises a computer system 210 that interacts with media 250. Computer system 210 comprises a processor 220, a network interface 225, a memory 230, a media interface 235 and an optional display 240. Network interface 225 allows computer system 210 to connect to a network, while media interface 235 allows computer system 210 to interact with media 250, such as a Digital Versatile Disk (DVD) or a hard drive.

As is known in the art, the methods and apparatus discussed herein may be distributed as an article of manufacture that itself comprises a computer-readable medium having computer-readable code means embodied thereon. The computer-readable program code means is operable, in conjunction with a computer system such as computer system 210, to carry out all or some of the steps to perform one or more of the methods or create the apparatus discussed herein. For example, the computer-readable code is configured to implement a method for indexing graphs in a database, the graphs comprising graphic data, by the steps of: identifying frequent subgraphs among one or more of the graphs in the database, the frequent subgraphs appearing in at least a threshold number of the graphs in the database; and using one or more of the frequent subgraphs to create an index of the graphs in the database. The computer-readable medium may be a recordable medium (e.g., floppy disks, hard drive, optical disks such as a DVD, or memory cards) or may be a transmission medium (e.g., a network comprising fiber-optics, the worldwide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk.

Memory 230 configures the processor 220 to implement the methods, steps, and functions disclosed herein. The memory 230 could be distributed or local and the processor 220 could be distributed or singular. The memory 230 could be implemented as an electrical, magnetic or optical memory, or any combination of these or other types of storage devices. Moreover, the term "memory" should be construed broadly enough to encompass any information able to be read from or written to an address in the addressable space accessed by processor 220. With this definition, information on a network, accessible through network interface 225, is still within memory 230 because the processor 220 can retrieve the information from the network. It should be noted that each distributed processor that makes up processor 220 generally contains its own addressable memory space. It should also be noted that some or all of computer system 210 can be incorporated into an application-specific or general-use integrated circuit.

Optional video display 240 is any type of video display suitable for interacting with a human user of apparatus 200. Generally, video display 240 is a computer monitor or other similar video display.

For ease of reference, the following description will be divided into the following sections: (I) Frequent Fragment, (II) Discriminative Fragment, (III) gIndex and (IV) Experimental Results.

(I) FREQUENT FRAGMENT

Figure 3:
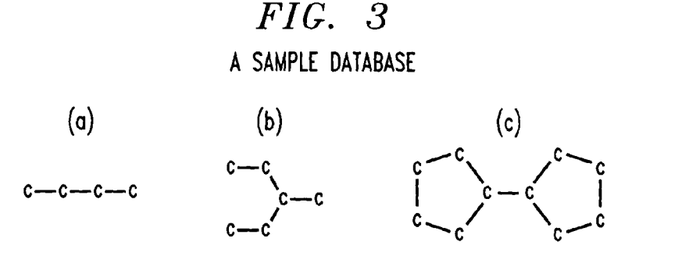
FIGS. 3a-c are diagrams illustrating a sample chemical structure database according to an embodiment of the present invention.
Figure 4:
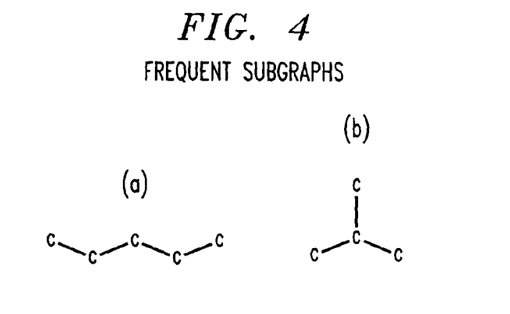
FIGS. 4a-b are diagrams illustrating sample frequent subgraphs according to an embodiment of the present invention.

Given a graph database D, $|D_g|$ is the number of graphs in D where g is a subgraph. $|D_g|$ is called (absolute) support and is denoted by support(g). As mentioned above in conjunction with the description of step 102 of FIG. 1, a graph g is a frequent subgraph if it has support in D of no less than a threshold number, minSup. Therefore, whether or not a particular graph is frequent is a relative concept depending on the setting of minSup. For example, FIGS. 3*a-c* are diagrams illustrating a sample chemical structure database. FIGS. 4*a-b* are diagrams illustrating sample frequent subgraphs of the chemical structure database shown illustrated in FIGS. 3*a-c* when minSup is equal to two.

Frequent subgraphs expose the intrinsic characteristics of a graph database. For example, if all the frequent subgraphs with minSup are indexed and if a query graph q is frequent, then all the graphs in the database containing q can be retrieved directly from the index, since q has already been indexed. Otherwise, q probably has other subgraphs whose support is above minSup. Among these subgraphs, let f be the subgraph which has the smallest support. Since any graph in the database with q embedded therein must contain all the subgraphs f of q, $D_f$ is a candidate answer set of query q. If minSup is set low, e.g., 100, and the support of f is close to 100, then it is not overly burdensome to verify each of the small number of graphs in $D_f$ in order to find the query answer set.

In the instance wherein q is not frequent in the graph database, all subgraphs of q can be sorted according to the level of support they provide, i.e., in the decreasing order $f_1$, $f_2, \ldots, f_n$. There exists a boundary between $f_i$ and $f_i+1$ wherein support $(f_i) \geq$ minSup and support $(f_{i+1}) <$ minSup. Since all the frequent subgraphs with minSup are indexed, the graphs containing $f_j$ ($1 \leq j \leq i$) are known. Therefore, the candidate answer set $C_q$ can be computed by $\cap_{1 \leq j \leq i} D_{fj}$. The size of $C_q$ is at most $f_i$. For many queries, the support of $f_i$ is likely to be close to minSup. Hence, the intersection of the frequent fragments $\cap_{1 \leq j \leq i} D_{fj}$ leads to a small size of $C_q$. Therefore, the cost of verifying $C_q$ is minimal when minSup is low. This result is confirmed, by way of example, in section (IV) below.

A key idea regarding frequent subgraphs in graph indexing follows from the above discussion. Namely, that it is feasible to construct high-quality indices using only frequent subgraphs. For low support queries (i.e., queries whose answer set is small), the size of candidate answer set $C_q$, which is related to the setting of minSup, is an important consideration. If minSup is set too high, the size of $C_q$ may be too large. If minSup is set too low, it is too difficult to generate all the frequent subgraphs because there may exist an exponential number of frequent subgraphs above minSup. For example, in a database consisting of 1,000 chemical compounds, the number of frequent graphs may be about $1 \times 10^4$ and about $1 \times 10^6$ when minSup is set at 100 and ten, respectively. The index would be more accurate when minSup is ten. However, more computation is needed in processing about $1 \times 10^6$ frequent graphs.

Therefore, it may not be optimal to enforce a uniform minSup for all subgraphs. In order to reduce the overall index size, it is appropriate for the index scheme to have a low minSup on small subgraphs (for effectiveness) and a high minSup on large subgraphs (for compactness). Using the example above, instead of setting minSup at ten uniformly, minSup can first be set at ten for subgraphs whose size is less than or equal to about six, and at 100 for subgraphs whose size is greater than about six. Using this kind of strategy, the size of the index would be between about $1 \times 10^4$ and about $1 \times 10^5$. This criterion on the selection of frequent subgraphs for effective indexing is termed "size-increasing support constraint." For example, given a monotonically nondecreasing function $\Psi(l)$, pattern G is frequent under the size-increasing support constraint if and only if support (g)$\geq \Psi(\text{len}(g))$, and thus $\Psi(l)$ is a size-increasing support function.

By enforcing the size-increasing support constraint, the index construction can be biased to include small subgraphs with a low minSup and large subgraphs with a high minSup. In an exemplary embodiment, the (absolute) minSup is chosen to be one for size-zero subgraphs to ensure the completeness of the indexing. Several distinct advantages result from employing size-increasing support constraint. First, the number of frequent subgraphs obtained is much less than would be obtained using the lowest uniform minSup. Second, low-support large subgraphs may be indexed by smaller subgraphs embedded therein. Therefore, useful subgraphs for indexing are not overlooked.

Figure 5:
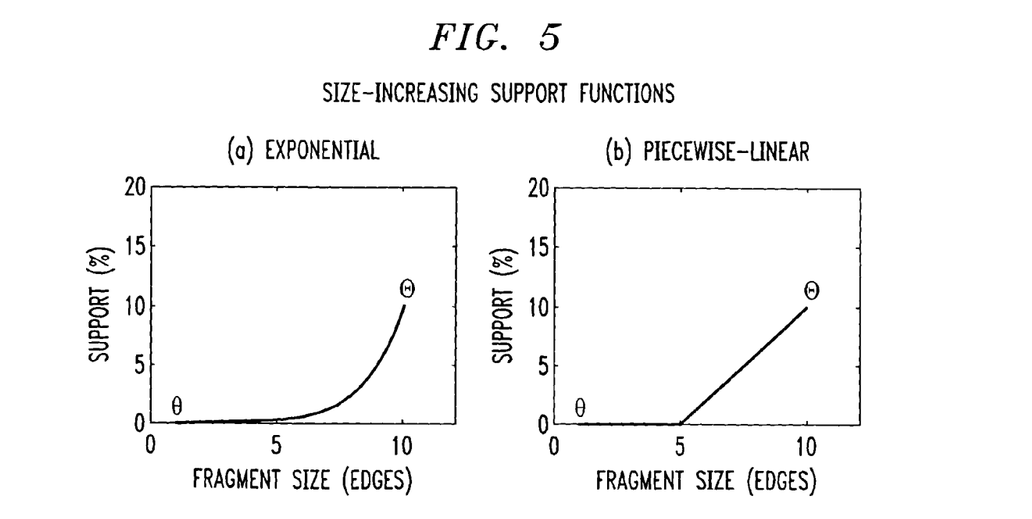
FIGS. 5a-b are graphs illustrating size-increasing support functions according to an embodiment of the present invention.

Two graphs illustrating exemplary size-increasing support functions are shown in FIGS. 5*a-b*. Specifically, FIG. 5*a* illustrates an exponential size-increasing support function and FIG. 5*b* illustrates a piecewise linear size-increasing support function. In this exemplary embodiment, size-one subgraphs were selected with minSup θ and larger subgraphs were selected with higher support until subgraphs up to size of maxL with minimum support Θ were exhausted. A typical setting of θ and Θ is one and 0.1N, respectively, wherein N is the size of the database. A wide range of monotonically nondecreasing functions are available to use as $\Psi(l)$.

By using frequent subgraphs with the size-increasing support constraint, a smaller number of subgraphs are present to index. However, the number of indexed subgraphs may still be very large when the support is low. For example, using the above piecewise linear size-increasing support function and having maxL be ten, 1,000 chemical graphs may easily produce 100,000 subgraphs of that kind. It is both time and space consuming to index all of these subgraphs. In section (II) below, a distillation procedure is designed to acquire discriminative subgraphs from the frequent subgraphs. As a result, only the most useful subgraphs are retained as indexing features.

(II) DISCRIMINATIVE FRAGMENT

As highlighted above in conjunction with the description of step 106 of FIG. 1, redundant subgraphs can be eliminated. Namely, if two similar frequent subgraphs $f_1$ and $f_2$, are embedded in the same set of graphs in the database, i.e., $D_{f1}=D_{f2}$, it is in the interest of efficiency to include only one of them in the feature set. Generally speaking, among similar subgraphs with the same support, it is often sufficient to index only the smallest common subgraph, since more query graphs may contain the smallest subgraph. For example, if f', a supergraph of subgraph f, has the same support as f, it will not be able to provide more information than f if both are selected as indexing features. Thus f' should be removed from the feature set. Namely, f' is no more discriminative than f.

For example, with reference to the sample database graphs presented in FIGS. 3*a-c*, all the graphs contain the carbon chains c,c-c,c-c-c and c-c-c-c. The subgraphs c-c,c-c-c and c-c-c-c do not provide more indexing power than subgraph c. Thus, they are useless for indexing and should be eliminated for that purpose, keeping only the smallest common subgraphs for indexing.

The concept of the discriminative power between a subgraph and a subgraph embedded therein can be further extended to the combination of a plurality of subgraphs embedded therein. Namely, a subgraph x is redundant with respect to feature set F if $D_x \approx \cap_{f \in F, f \subseteq x} D_f$ Each graph in set $\bigcap_{f \in F \wedge f \subseteq x} D_f$ contains all of the subgraphs of x in the feature set F. Having $D_x$ close to $\bigcap_{f \in F \wedge f \subseteq x} D_f$ implies that the presence of subgraph x in a graph can be predicted by the presence of the subgraphs of x. Thus, graph x should not be used as an indexing feature since it does not provide any benefit, especially since the subgraphs of x are already being used as indexing features. In such a case, x is a redundant subgraph.

In contrast, there are subgraphs which are not redundant. These subgraphs are called discriminative subgraphs. For example, subgraph x is discriminative with respect to F if $D_x \ll \bigcap_{f \in F \wedge f \subseteq x} D_f$.

Figure 6:
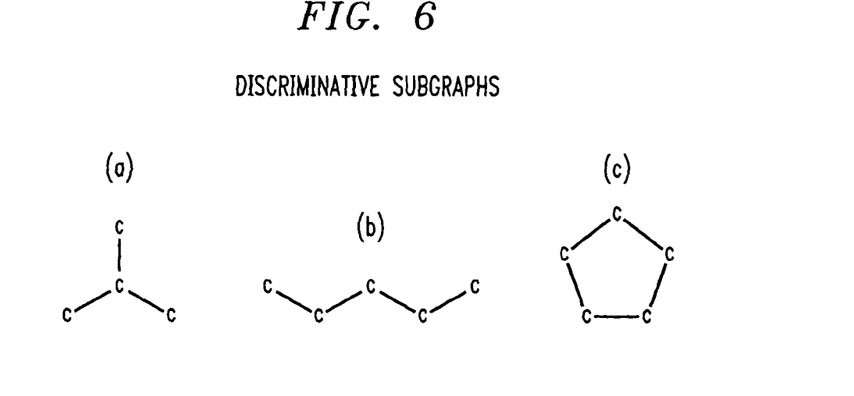
FIGS. 6a-c are diagrams illustrating sample discriminative subgraphs according to an embodiment of the present invention.

FIGS. 6a-c are diagrams illustrating sample discriminative subgraphs with regard to the sample database graphs presented in FIGS. 3a-c. For example, the carbon ring shown in FIG. 6c is a discriminative subgraph since only the graph shown in FIG. 3c contains the same carbon ring, while the graphs shown in FIGS. 3b and 3c have all of the subgraphs of the carbon ring. Using a similar reasoning, the subgraphs shown in FIGS. 6a and 6b are also discriminative.

Since $D_x$ is always a subset of $\bigcap_{f \in F \wedge f \subseteq x} D_f$, X should be either redundant or discriminative. The degree of redundancy, a relative concept, can be measured as follows. Subgraphs $f_1$, $f_2$, ..., $f_n$ are considered to be indexing features. Given a new subgraph x, the discriminative power of x can be measured by:

$$PR(x|f_{\phi 1}, \ldots, f_{\phi m}), f_{\phi i} \subseteq x, 1 \leq \phi i \leq n. \quad (1)$$

Equation 1, above, shows the probability of the presence of x, given the presence of $f_{\phi 1}$, ..., $f_{\phi m}$, in a graph. $1/Pr(x|f_{\phi 1}, \ldots, f_{\phi m})$ can be denoted by $\gamma$, called the discriminative ratio, which has the following properties: $\gamma \geq 1$; when $\gamma = 1$ subgraph x is completely redundant since the graphs indexed by this subgraph can be fully indexed by the combination of subgraph $f_{\phi i}$; when $\gamma \gg 1$ subgraph x is more discriminative than the combination of subgraph $f_{\phi i}$ (thus x is a good candidate to index) and $\gamma$ is related to the subgraphs which are already in the feature set.

The discriminative ratio can be calculated by the following formula:

$$\gamma = \frac{|\bigcap_i D_{f \phi i}|}{|D_x|}, \quad (2)$$

wherein $D_x$ is the set of graphs containing x and $\bigcap_i D_{f \phi i}$ is the set of graphs which contain subgraphs of x in the feature set. In order to mine discriminative subgraphs, a minimum discriminative ratio $\gamma_{min}$ may be set such that any subgraph whose discriminative ratio is no less than $\gamma_{min}$ is retained.

For example, suppose the parameters $\Psi(1) = 1$ and $\gamma_{min} = 1.5$ are set for the sample database graphs presented in FIGS. 3a-c. FIGS. 6a-c, as described above, illustrate three discriminative subgraphs. Typically, a graph without any vertex and edge $f_\phi$, is added into the feature set as the initial feature. There would be other discriminative subgraphs in this sample dataset if the size-increasing support constraint was not enforced. The discriminative ratios of the subgraphs illustrated in FIGS. 6a, 6b and 6c are 1.5, 1.5 and 2.0, respectively. The discriminative ratio of the subgraph illustrated in FIG. 6c is computed as follows. It is assumed that the subgraphs illustrated in FIGS. 6a and 6b have already been selected as index features. There are two graphs illustrated in FIGS. 3a-c that contain the subgraph illustrated in FIG. 6b and one graph that contains the subgraph illustrated in FIG. 6c. Since the subgraph illustrated in FIG. 6b is a subgraph of the graph illustrated in FIG. 6c, the discriminative ratio of the subgraph illustrated in FIG. 6c is 2/1=2.0.

(III) gINDEX

According to the present indexing techniques, the graph index of the present invention, gIndex, makes use of frequent substructures, e.g., subgraphs, as the basic indexing feature. As described above, frequent substructures are ideal candidates for indexing since they explore the intrinsic characteristics of the data and are relatively stable to database updates.

Figure 7:
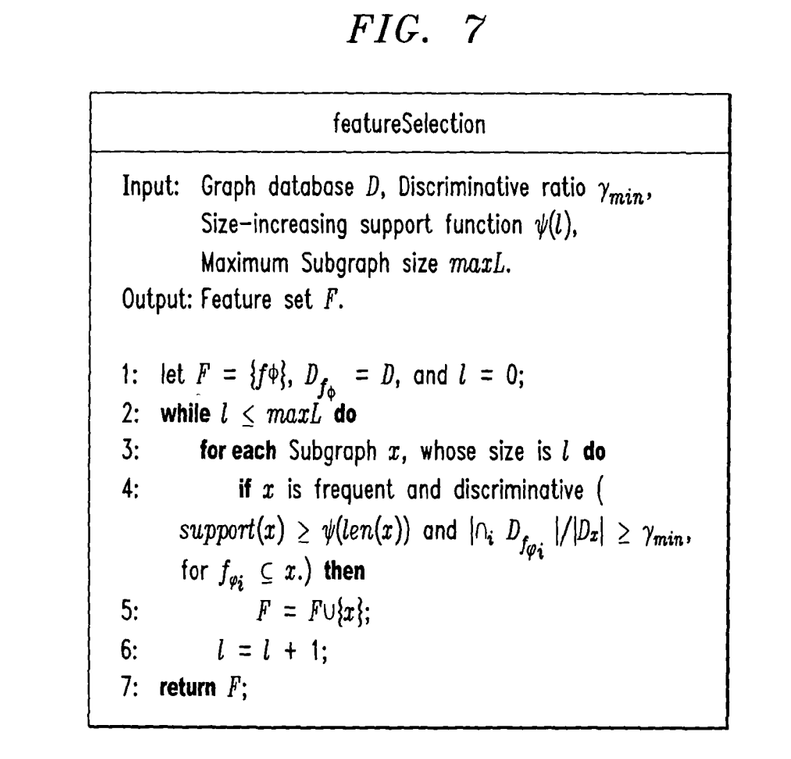
FIG. 7 illustrates an exemplary methodology for determining frequent subgraphs among the graphs in a database according to an embodiment of the present invention.

First, as described above, all frequent subgraphs with the size-increasing support constraint are generated. To select discriminative subgraphs, redundant frequent subgraphs are eliminated. This selection process proceeds in a level-wise manner, i.e., breadth-first search (BFS), according to the exemplary methodology illustrated in FIG. 7. FIG. 7 is an exemplary methodology for determining frequent subgraphs among the graphs in a database. In FIG. 7, the loop including lines 1-7 of the code is an iterative process that provides frequent and discriminative subgraphs, of sizes up to maxL, in a feature set F.

Once discriminative subgraphs are selected, gIndex has efficient data structures to store and retrieve them. The gIndex translates subgraphs into sequences and holds the sequences in a prefix tree. Each subgraph is associated with an id list, associating each graph with the subgraph(s) embedded therein.

A substantial portion of the computation involved in gIndex construction and searching is related to graph isomorphism checking. Namely, a given subgraph has to be quickly retrieved from the index. Considering that graph isomorphism testing is complex, it is inefficient to scan the whole feature set to match subgraphs one by one. An efficient solution is to translate a graph into a sequence, called a canonical label. If two subgraphs are the same, they must share the same canonical label.

Certain sequentialization methods focus on concatenating rows or columns of the adjacency matrix of a graph into an integer sequence. However, since most graphs in real applications are sparse, these sequentialization methods may not work efficiently. Namely, the methods result in many useless zeros in the canonical label. Furthermore, it is not space efficient to store adjacency matrices. Thus, the present techniques utilize adjacency list representations of graphs, but do not store adjacency matrices.

Figure 8:
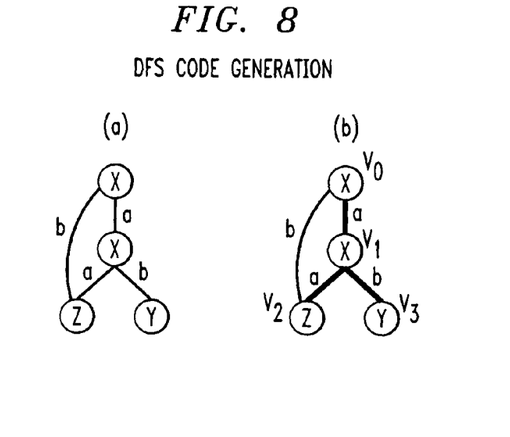
FIGS. 8a-b are diagrams illustrating the translation of a graph into a unique edge sequence.

A graph sequentialization method, called DFS coding, can translate a graph into a unique edge sequence, which is generated by performing a DFS search in a graph. See, for example, X. Yan et al., *CloseGraph: Mining Closed Frequent Graph Patterns*, KDD '03, the disclosure of which is incorporated by reference herein. FIGS. 8a-b are diagrams illustrating the translation of a graph into a unique edge sequence according to the DFS coding method. A DFS search tree of the graph shown illustrated in FIG. 8a is illustrated in FIG. 8b, represented by the bolded edges in the diagram. Based on the DFS search order shown in the diagram illustrated in FIG. 8b, a DFS code is formed by the edge sequence: $(v_0, v_1)(v_1, v_2)(v_2, v_0)(v_1, v_3)$. For any graph g, the minimum DFS code is chosen as a canonical label, denoted by dfs(g).

As was highlighted above in conjunction with the description of step 108 of FIG. 1, the graph index can be mapped on a tree structure. Namely, using the above DFS coding sequentialization method, each subgraph can be mapped to an edge sequence (e.g., a DFS code). The edge sequences of discriminative subgraphs are inserted in a prefix tree, called a gIndex tree.

Figure 9:
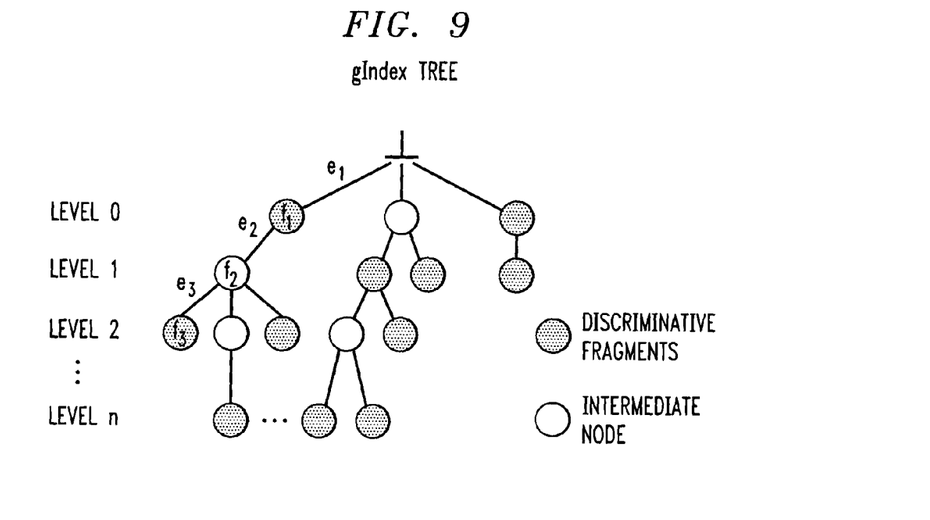
FIG. 9 is a diagram illustrating an exemplary tree structure according to an embodiment of the present invention.

FIG. 9 is a diagram illustrating an exemplary tree structure. Specifically, FIG. 9 shows a gIndex tree, wherein each node represents a subgraph (a DFS code). For example, two discriminative subgraphs $f_1=\langle e_1 \rangle$ and $f_3=\langle e_1 e_2 e_3 \rangle$ are stored in the gIndex tree (for brevity, $e_i$ is used to represent edges in the DFS codes). Although subgraph $f_2=\langle e_1 e_2 \rangle$ is not a discriminative subgraph, $f_2$ has to be stored in order to connect subgraphs $f_1$ and $f_3$.

In gIndex tree, all size-n discriminative subgraphs are recorded in Level n (size-zero subgraphs are graphs with only one vertex and no edge) (the root node in the tree is $f_\phi$). In the gIndex tree, code s is an ancestor of s' if and only if s is a prefix of s'. Black nodes are used to denote discriminative subgraphs. White nodes (redundant subgraphs) are intermediate nodes which connect the whole gIndex tree. All leaf nodes are discriminative subgraphs since it is useless to store redundant subgraphs in leaf nodes. In each black node $f_i$ an id list ($I_i$) (the ids of graphs containing $f_i$) is recorded. White nodes do not have any id list. To retrieve graphs which contain both subgraphs $f_i$ and $f_j$, $I_i$ and $I_j$ are intersected.

The gIndex tree structure has at least two advantages over other index structures, e.g., B+ tree. First, the gIndex tree records not only discriminative subgraphs, but also some redundant subgraphs. This setting makes the pruning of the index, as will be described in detail below, possible. Second, the gIndex tree can reduce the number of intersection operations conducted on id lists of discriminative subgraphs by using (approximate) maximum subgraphs only, as will be described in detail below. In short, search time $T_{search}$ will be significantly reduced by using the gIndex tree.

The gIndex tree is implemented using a hash table to help in locating subgraphs and in retrieving the id lists of the subgraphs quickly. Both the black nodes and the white nodes are included in the hash table. The use of a hash table is in lieu of a direct implementation of the tree structure. Nonetheless, the gIndex tree concept is useful in determining the redundant (white) nodes which, as included in the index, will facilitate the pruning of search space.

Using the DFS coding sequentialization method, any graph can be mapped to an integer by hashing the canonical label of the graph. For example, given a sequence hash function h and a graph g, h(dfs(g)) is called graphic hash code. The graphic hash code is treated as the hash value of a graph. Thus, if two graphs g and g' are isomorphic, then h(dfs(g))=h(dfs(g')). Graphic hash code can help in quickly locating subgraphs in the gIndex tree.

Figure 10:
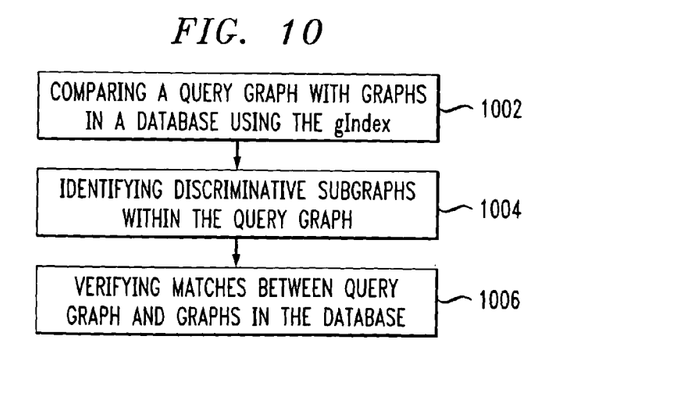
FIG. 10 is a diagram illustrating an exemplary methodology for comparing a query graph with graphs in a database according to an embodiment of the present invention.

The gIndex may then be used to perform graph query searches. FIG. 10 is a diagram illustrating an exemplary methodology for comparing a query graph with graphs in a database. Namely, in step 1002 of FIG. 10, a query graph is compared with graphs in a database using the gIndex tree. Use of the gIndex tree to compare graphs will be described in detail below. In step 1004 of FIG. 10, discriminative subgraphs are identified within the query graph. Identifying discriminative subgraphs in the query graph will be described in detail below. In step 1006 of FIG. 10, matches between the query graph and the graphs in the database are verified. Verifying graph matches will also be described in detail below.

Figure 11:
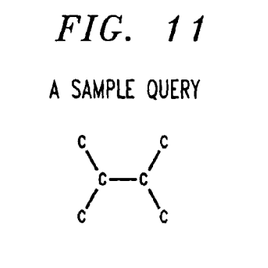
FIG. 11 is a diagram illustrating a sample query chemical structure according to an embodiment of the present invention.

In an exemplary embodiment, given a graph database $D=\{g_1, g_2, \ldots, g_n\}$ and a query graph q, a query answer set $D_q=\{g_i | q \subseteq g_i, g_i \in D\}$ is determined. For example, given the sample graphs shown illustrated in FIGS. 3a-c and the sample query chemical structure shown in FIG. 11, the query answer set $D_q$, has only one element, e.g., the graph shown illustrated in FIG. 3c.

As will be described in detail below, query processing comprises two primary steps, searching and verification. Searching enumerates all the features in a query graph q, to compute the candidate query answer set $C_q = \cap_f D_f (f \subseteq q$ and $f \in F)$ (each graph in $C_q$ containing all of the features of q in the feature set). Therefore, $D_q$ is a subset of $C_q$. Verification checks graph g in $C_q$ to verify whether q is really a subgraph of g.

In graph query processing, a primary concern is query response time, $$T_{search} + C_q * T_{iso\_test}, \qquad (3)$$

wherein $T_{search}$ is the time spent in the search step and $T_{iso\_test}$ is the average time of subgraph isomorphism testing, which is conducted over query q and graphs in $C_q$. In the verification step, it takes $C_q * T_{iso\_test}$ to prune false positives in $C_q$. Usually the verification time dominates Equation 3 since the computational complexity of $T_{iso\_test}$ is NP-complete. The value of $T_{iso\_test}$ does not change much, if at all, for a given query. Thus, the key to improve query response time is to minimize the size of the candidate answer set, $C_q$. For example, if a graph database is large, such that the index cannot be held in the memory, $T_{search}$ may be critical for the query response time.

It is also beneficial to minimize the index size M, which is approximately proportional to the size of the feature set |F|:

$$M \propto |F|. \qquad (4)$$

Thus, in order to reduce the index size, it is important to maintain a compact feature set. Otherwise, if the index is too large to reside in the memory, the cost of accessing F may be even greater than that of accessing the graph database itself.

Figure 12:
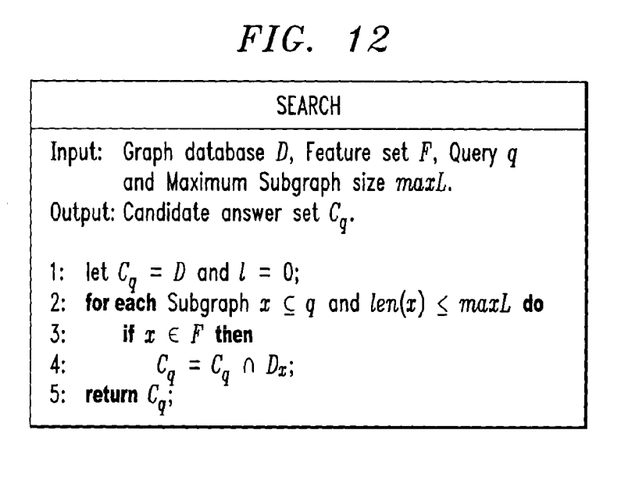
FIG. 12 illustrates an exemplary methodology for generating a candidate answer set according to an embodiment of the present invention.

FIG. 12 illustrates an exemplary methodology for generating a candidate answer set. In FIG. 12, the loop including lines 1-5 of the code is an iterative process that provides a candidate answer set $C_q$ for a query q matching graphs in a graph database D. For example, given a query q, the gIndex enumerates all subgraphs up to a maximum size and locates them in the index. The gIndex then intersects the id lists associated with these subgraphs.

The methodology outlined in FIG. 12 should be optimized. Namely, it is inefficient to first generate every subgraph in the query graph and then check whether that subgraph belongs to the index. Therefore, if a subgraph is not in the gIndex tree, one does not need to proceed checking the super-graphs of that subgraph any more. That is why some redundant subgraphs are recorded in the gIndex tree.

As highlighted above, a hash table H may be used to facilitate pruning the gIndex tree. It contains all the graphic hash codes of the nodes shown in the gIndex tree including black nodes and white (redundant subgraphs) intermediate nodes. In an exemplary embodiment, whenever a subgraph is found in a query having a hash code that does not appear in H, the super-graphs of that subgraph are no longer considered.

As highlighted above, operation $c_q = c_q \cap D_x$ is performed by intersecting the id lists of $C_q$ and $D_x$. In an exemplary embodiment, the number of intersection operations is reduced. For example, it is logical that if query q has two subgraphs, $f_x \subset f_y$, then $C_q \cap D_{f_x} \cap D_{f_y} = C_q \cap D_{f_y}$. Therefore, it is not necessary to intersect $C_q$ with $D_{f_x}$. Let F(q) be the set of discriminative subgraphs (or indexed features) contained in query q, i.e., $F(q) = \{f_x | f_x \subseteq q \hat{} f_x \in F\}$. Let $F_m(q)$ be the set of subgraphs in F(q) that are not contained by other subgraphs in F(q), i.e., $F_m(q) = \{f_x | f_x \in F(q), \text{ s.t., } f_x \subset f_y \hat{} f_y \in F(q)\}$. The subgraphs in $F_m(q)$ are called maximum discriminative subgraphs. In order to calculate $C_q$, intersection operations only need to be performed on the id lists of maximum discriminative subgraphs.

Further, it is cumbersome to compute $F_m(q)$ if the subgraph enumeration methodology does not generate all super-graphs of each subgraph. Thus, $F_m(q)$ may be replaced with the approximate maximum discriminative subgraph set $F'_m(q)=\{f_x|f_x \epsilon F(q), s. t., f_y \text{ is } f_x\text{'s descendant in the gIndex tree and } f_y \epsilon F\}$. $F'_m(q)$ is easy to compute.

The definition of support provided above considers only the frequency of a subgraph in a graph dataset. One subgraph may appear several times even in one graph. For example, given a graph g, the inner support of subgraph x is the number of embeddings of x in g, denoted by inner_support(x,g). Further, if g is a subgraph of G and subgraph $x \subset g$, then inner_support(x,g)≦inner_support(x,G).

To employ inner support techniques, the inner support of discriminative subgraphs have to be stored together with the corresponding graph id lists, doubling space costs. The pruning power of the above methodology is related to the sizes of the particular query graphs. Therefore, if a query graph is large, using inner support pruning methods can improve efficiency.

After getting the candidate answer set $C_q$, the graphs in $C_q$ (i.e., whether the graphs in $C_q$ contain the query graph or not) should be verified. An easy way to verify the graphs in $C_q$ is to perform a subgraph isomorphism test on each graph one by one.

Figure 13:
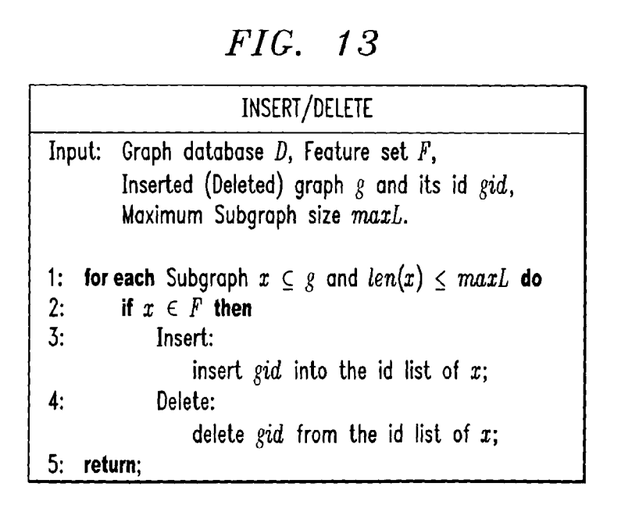
FIG. 13 illustrates an exemplary methodology for maintaining the gIndex according to an embodiment of the present invention.

The present indexing methodology may be employed to handle insertion and/or deletion operations. Insertion operations add new graphs into the graph database while deletion operations remove graphs which have already been in the graph database. Since the insertion/deletion operation changes the ownership of subgraphs in the index, the id lists of involved subgraphs have to be updated. The methodology for the incremental updating is illustrated in FIG. 13. In FIG. 13, the loop including lines 1-5 of the code is an iterative process that provides for updating graph database D in response to the insertion/deletion of graph g into D/from D, respectively. Updating, according to the present techniques, does not reconstruct the index structure from scratch. Instead, only the ids of the inserted or deleted graphs are updated. That is, the index structure is maintained incrementally. If the distribution of frequent graphs and the corresponding support(s) in the graph database before and after the insertion and the deletion do not change, the index updated using this methodology would not significantly differ from the index created from scratch. Therefore, the index is not only maintained in a very efficient way, but also achieves the same performance as a creating a new index. As shown in the experiments below, frequent patterns are relatively stable to database updates. Namely, a small number of insertion and deletion operations will not significantly change their distribution, hence the incremental maintenance of the index is very effective.

The incremental maintenance methodology introduced above leads to another interesting result, namely, a single database scan methodology for the index construction. Rather than mining discriminative subgraphs from the whole graph database, one can actually first sample a small portion of the original database randomly, load it into the main memory, mine discriminative subgraphs from this small amount of data and then build the index by scanning the remaining database once. This strategy can significantly reduce the index construction time, especially when the database is large. As long as the sample data reflects the data distribution in the original database, the single scan methodology works very well.

The quality of the gIndex may degrade over time following numerous insertion and deletion operations. Thus, a measure is needed to monitor the quality of the discriminative subgraphs indexed (which may have been superceded during update operations). The quality of the gIndex, as represented, e.g., by the effectiveness of the index, can be measured by $$\frac{|\bigcap_f D_f|}{|D_x|},$$

wherein f∈F, $f \subset x$, over some set of randomly selected query graphs (x).

$$\frac{|\bigcap_f D_f|}{|D_x|}$$

is the ratio of the candidate answer set size over the actual answer set size. The value of $$\frac{|\bigcap_f D_f|}{|D_x|}$$

is monitored based on sampled queries and the checked over time for changes. A sizable value increase of $$\frac{|\bigcap_f D_f|}{|D_x|}$$

implies that the effectiveness of the gIndex has deteriorated, probably because some discriminative subgraphs are missing from the indexing features. In this instance, it may be most effective to recompute the index from scratch.

(IV) EXPERIMENTAL RESULTS

Experimentation may be used to illustrate the effectiveness and efficiency of the gIndex. The performance of gIndex will be compared with that of a path-based approach, e.g., Graph-Grep, disclosed, for example, in Shasha.

Two kinds of datasets were used, one real dataset and a series of synthetic datasets. The real dataset was that of an acquired immunodeficiency syndrome (AIDS) antiviral screen dataset containing chemical compounds, as provided by the Developmental Therapeutics Program. As of March 2002, the dataset contained 43,905 classified chemical molecules. To obtain the synthetic datasets, a synthetic data generator was employed. See, for example, the synthetic data generator provided in M. Kuramochi et al., *Frequent Subgraph Discovery*, ICDM'01 (hereinafter "Kuramochi"), the disclosure of which is incorporated by reference herein. The generator allowed a user to specify the number of graphs D, the average size of the graphs T, the number of seed graphs S, the average size of the seed graphs I and the number of distinct labels L.

All the experiments were performed on a 1.5 gigahertz (GHZ), one gigabyte (GB)-memory, Intel PC running RedHat 8.0. Both GraphGrep and gIndex were compiled with gcc/g++.

Regarding the AIDS antiviral screen dataset, the following parameters were set for index construction. In GraphGrep, the maximum length of indexing paths was set at ten. Therefore, GraphGrep was configured to enumerate all possible paths with length up to ten and index them. GraphGrep was also set to have a finger set size as large as possible (e.g., greater than or equal to about 10,000). In gIndex, the maximum subgraph size maxL was also set at ten. The minimum discriminative ratio $\gamma_{min}$ was set at two. The maximum support $\Theta$ was set at 0.1N. The size-increasing support function $\Psi(l)$ for gIndex was one if l was less than four. In all other cases, $\Psi(l)$ was $$\sqrt{\frac{l}{\max L}\Theta}.$$

Therefore, all subgraphs with a size less than four were indexed. It is important to note that performance is not sensitive to the selection of $\Psi(l)$. For example, there are other size-increasing support functions that can be applied, e.g., $$\frac{l}{\max L}\Theta, \left(\frac{l}{\max L}\right)^2\Theta.$$

The maximum size of features was chosen to be the same in GraphGrep and gIndex, so that a fair comparison between the two could be accomplished.

Figure 14:
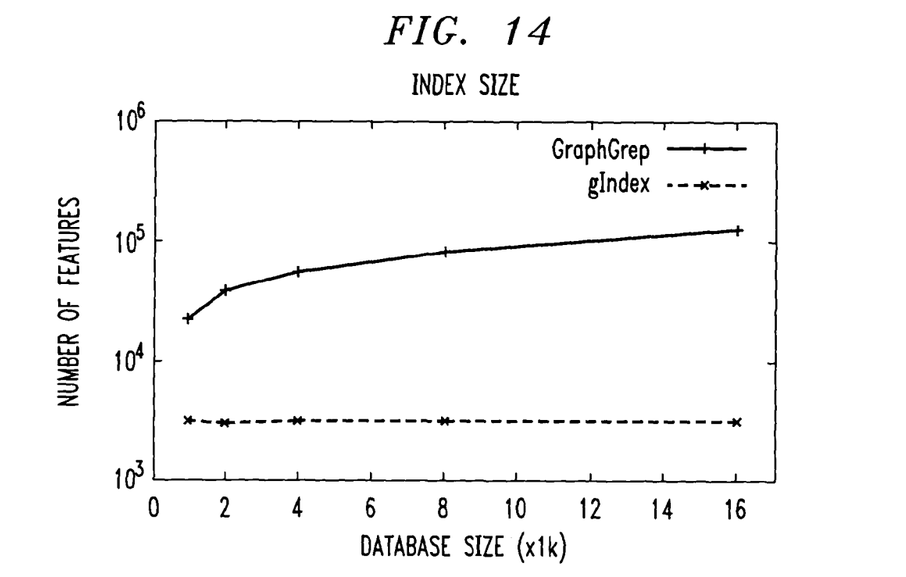
FIG. 14 is a graph illustrating the size of the index created using the present techniques versus a path-based method.

First, the index size of GraphGrep and gIndex were tested. As highlighted above, GraphGrep indexes paths while gIndex uses discriminative frequent subgraphs. The test dataset consisted of N graphs, denoted by $\Gamma_N$, which were randomly selected from the antiviral screen database. FIG. 14 is a graph illustrating the size of the index created using the present techniques versus a path-based method. Namely, FIG. 14 depicts the number of features used in GraphGrep and gIndex with the test dataset size varied from 1,000 to 16,000.

The curves in the graph illustrated in FIG. 14 clearly show that the index size of gIndex is at least ten times smaller than that of GraphGrep. The curves in the graph illustrated in FIG. 14 also illustrate additional properties of gIndex. Namely, that the index size of gIndex is small and stable. When the database size increases, the index size of gIndex does not change significantly, if at all. The stability of the gIndex is due to the fact that frequent subgraphs and discriminative frequent subgraphs remain relatively unchanged for data having a similar distribution, as highlighted above. In contrast, the index size of GraphGrep increases significantly over the same range of database size values because GraphGrep has to index all possible paths existing in a database (e.g., up to a length of ten, as was set in the present experimentation).

Having verified the index size, the performance of GraphGrep and gIndex can be checked. As mentioned above, the cost of a given query is characterized by the number of candidate graphs that have to be verified, i.e., the size of candidate answer set $C_q$. The cost can be averaged as follows:

$$AVG(|C_q|) = \frac{\sum_{q \in Q} |C_q|}{|Q|}. \quad (5)$$

Namely, the smaller the cost, the better the performance. $AVG(|D_q|)$ is the lower bound of $AVG(|C_q|)$. A methodology achieving this lower bound actually matches the queries in the graph dataset precisely.

$\Gamma_{10,000}$ is selected as the performance test dataset. Six query sets were tested, each of which had 1,000 queries (obtained by randomly drawing 1,000 graphs from the antiviral screen dataset and then extracting a connected size-m subgraph from each graph randomly). These 1,000 queries were taken as a query set, denoted by $Q_m$. As a result, $Q_4$, $Q_8$, $Q_{12}$, $Q_{16}$, $Q_{20}$, and $Q_{24}$ were generated. Each query set was then divided into two groups, a low support group (e.g., having a support of less than 50) and a high support group (e.g., having a support between 50 and 500). Such partitions were made to demonstrate that gIndex can accommodate all kinds of queries, independent of whether the queries are frequent or not-frequent, large or small.

Figure 15:
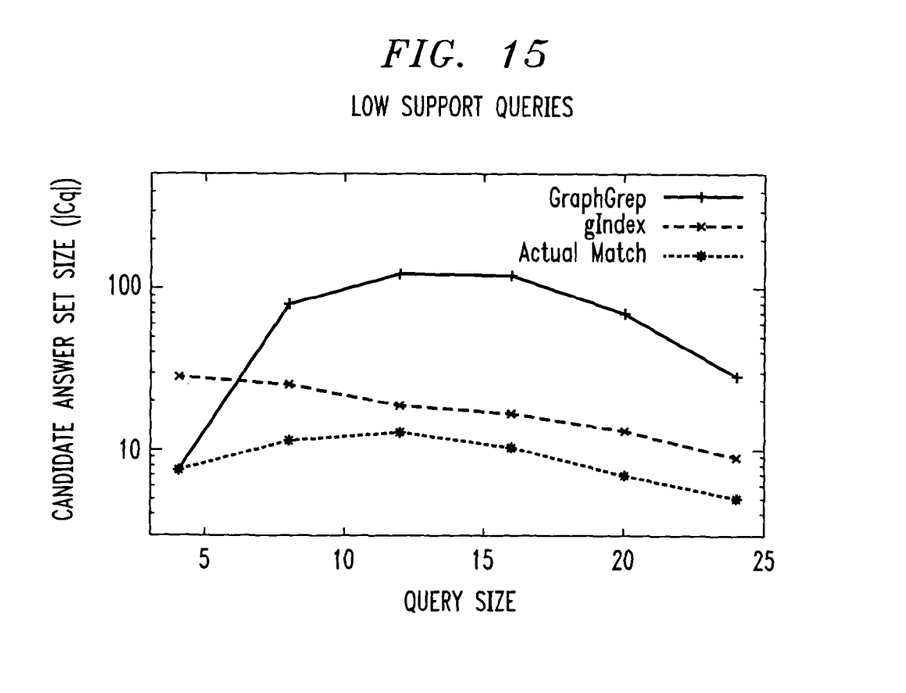
FIG. 15 is a graph illustrating query search performance of the present techniques versus a path-based method.
Figure 16:
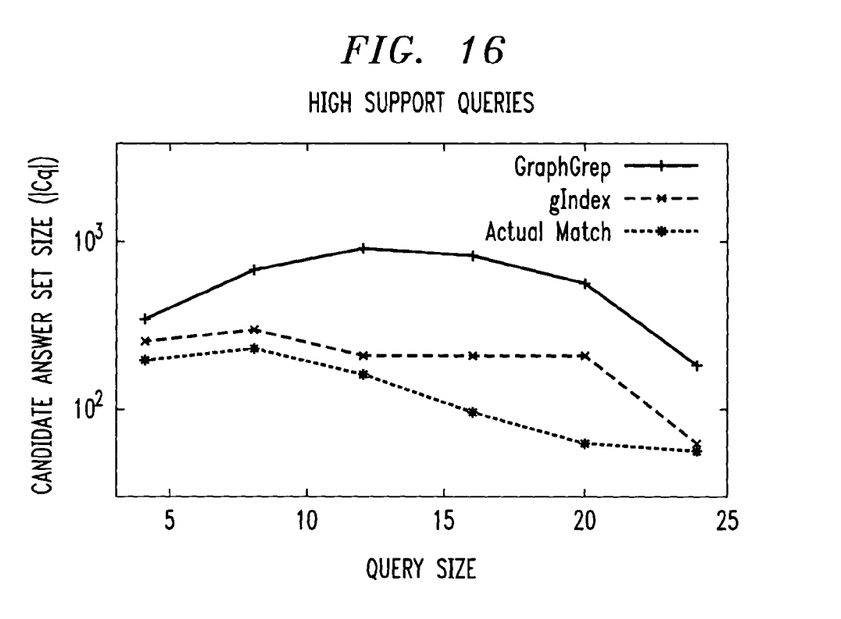
FIG. 16 is another graph illustrating query search performance of the present techniques versus a path-based method.

FIGS. 15 and 16 are graphs illustrating query search performance. Namely, FIGS. 15 and 16 present the performance of GraphGrep and gIndex on low support queries and high support queries, respectively. The average size of query answer sets $AVG(|D_q|)$ (which is the highest performance that the methodology can achieve) is also plotted.

As shown in the graphs illustrated in FIGS. 15 and 16, gIndex outperformed GraphGrep in every query set, except the low support queries in the first query set (e.g., $Q_4$). GraphGrep works better on query set $Q_4$ because the queries in $Q_4$ are more path-structured and the exhaustive enumeration of paths in GraphGrep favors these types of queries. Another reason GraphGrep works better on query set $Q_4$ is that the setting of $\Psi(l)$ in gIndex has a minimum support jump on size-four subgraphs (e.g., from one to 632).

Figure 17:
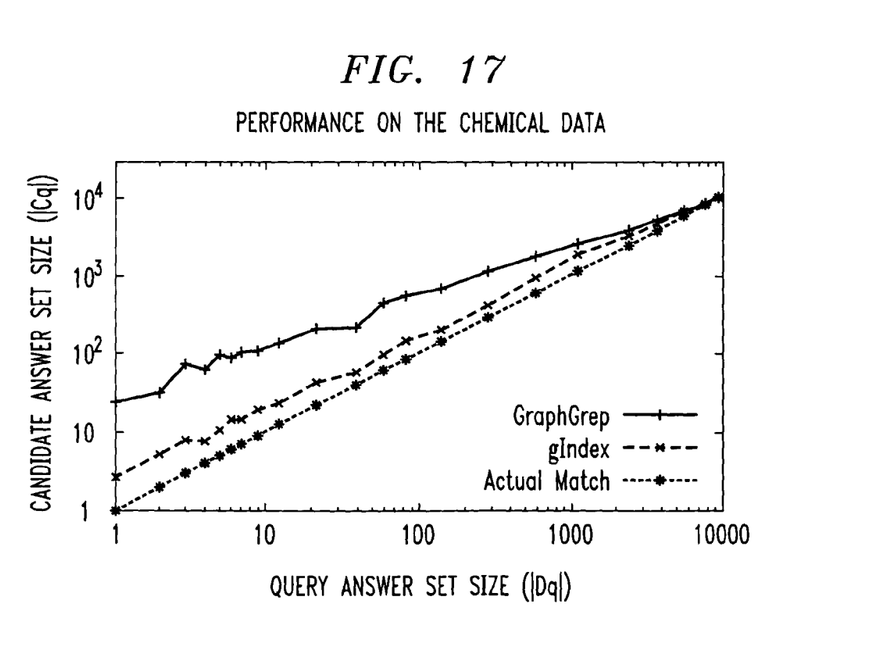
FIG. 17 is a graph illustrating performance of the present techniques versus a path-based method according to the query answer set size.

FIG. 17 shows performance based on the query answer set size (query support), i.e., $|D_q|$. The x-axis shows the actual answer set size while the y-axis shows the average size of the candidate answer set $|C_q|$. The closer $|C_q|$ is to $|D_q|$, the better the performance. The performance gap between gIndex and GraphGrep is reduced when query support increases. The underlying reason for this reduction is that higher support queries typically have simpler, smaller structures. GraphGrep typically performs well with such structures. When $|D_q|$ is close to 10,000, $|C_q|$ will approach $|D_q|$ since 10,000 is the upper bound in this test. Overall, gIndex outperforms GraphGrep by three to ten times when the answer set size is below 1,000.

Similarly, gIndex performs well on queries which have low support, or even no support (i.e., no match), in the database. The size-increasing support constraint and the intersection power of structure-based features in gIndex are the two key factors for this result.

Figure 18:
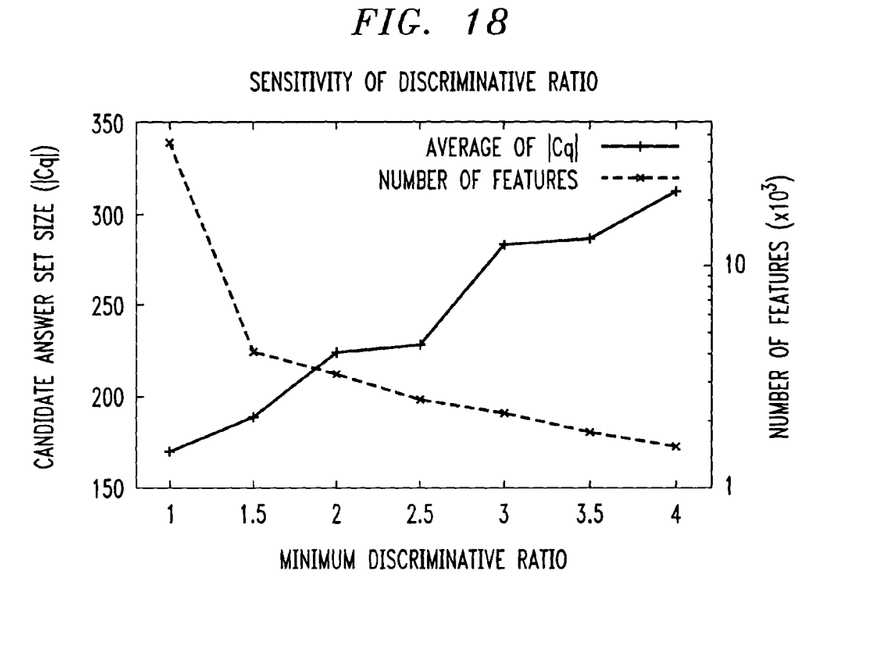
FIG. 18 is a graph illustrating the effect of the discriminative ratio value on the performance and index size according to an embodiment of the present invention.

The sensitivity of the minimum discriminative ratio $\gamma_{min}$ was then checked. FIG. 18 is a graph illustrating performance and index size of gIndex with different $\gamma_{min}$ values. Namely, the query set $Q_{12}$ was processed on dataset $\gamma_{10,000}$. The results showed that the query response time is gradually improved when $\gamma_{min}$ decreases. At the same time, the index size increased. Therefore, some trade-off between performance and space cost does exist.

Figure 19:
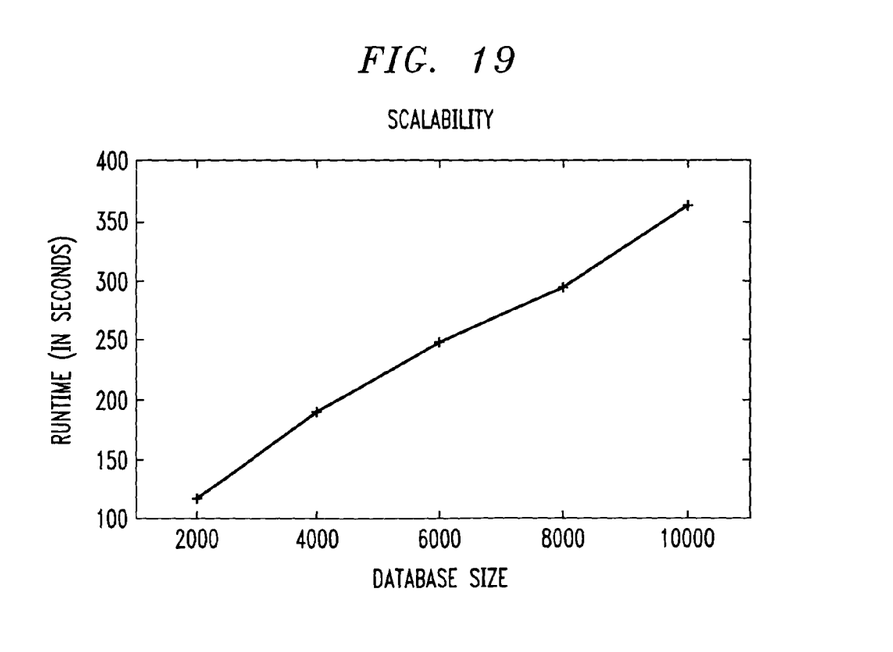
FIG. 19 is a graph illustrating the effect of database size on index construction time according to an embodiment of the present invention.

The scalability of gIndex is presented in FIG. 19. The database size was varied from 2,000 to 10,000 and the gIndex was constructed from scratch for each database. As is illustrated in FIG. 19, the index construction time was proportional to the database size, resulting in a linear increasing trend. The feature set mined by gIndex for each database was found to have about 3,000 discriminative subgraphs. The number of discriminative subgraphs does not change much, if at all, across different databases, which may explain why the index construction time increases linearly. Since the size-increasing support function $\Psi(l)$ follows the database size, $\Psi(l) \propto \Theta \propto N$, the frequent subgraph set will be relatively stable if the databases have a similar distribution.

The stability of frequent subgraphs leads to the effectiveness of the incremental maintenance methodology. For example, if it is assumed that there are two databases D and D'=D+$\Sigma_i D_i^+$, where $D_i^+$ comprises updates over the original database D. As long as the graphs in D and $D_i^+$ are from the same reservoir, a separate index does not have to be built for D'. Instead, the feature set of D may be reused for the whole dataset D'.

In an exemplary embodiment, $\Gamma_{2,000}$ is taken as the initial dataset D. Another 2,000 graphs are added to D and the index is updated using the methodology outlined in FIG. 13. Such additions and updates are conducted four times until the dataset has 10,000 graphs in total.

Figure 20:
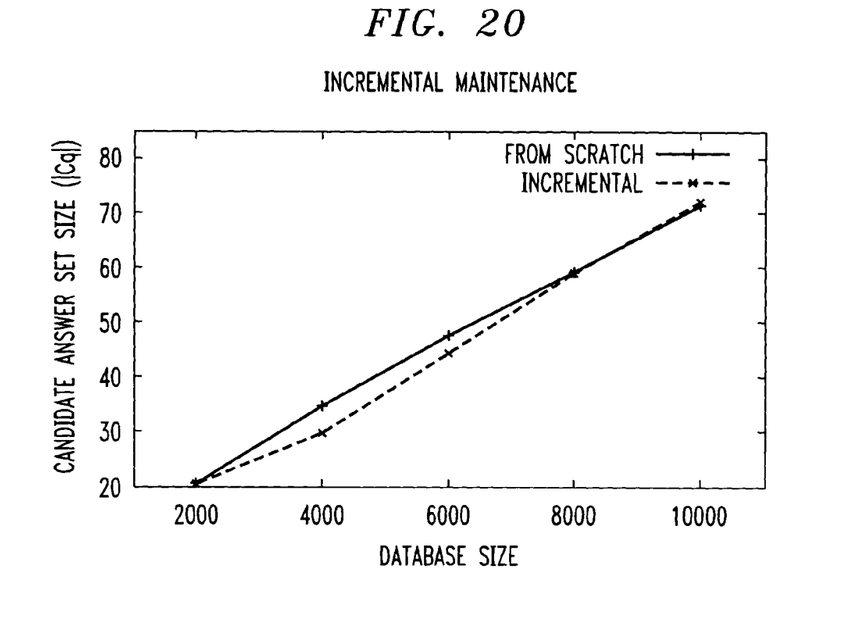
FIG. 20 is a graph illustrating a search performance comparison of the incremental maintenance of the index versus creation of the index from scratch according to an embodiment of the present invention.

The performance of the index obtained from this incremental maintenance may then be compared with an index computed from scratch. Query set $Q_{16}$, for example, may be selected to test each index. FIG. 20 shows the comparison between these two approaches. As is shown illustrated in FIG. 20, the incrementally maintained index exhibited similar performance to the index computed from scratch, occasionally even performing better (as evidenced by the small gap between the two curves). These favorable results indicate that the index can first be constructed on a small portion of a large database, and then the incremental maintenance methodology used to build the complete index for the whole database, in one scan.

Regarding the synthetic datasets, each dataset was generated as follows. First, a set of S seed subgraphs were generated randomly, having a size determined by a Poisson distribution with mean I. The size of each graph was a Poisson random variable with mean T. Seed subgraphs were then randomly selected and inserted into a graph one by one. For a detailed description of generating synthetic datasets, see, for example, Kuramochi. Thus, for example, a typical dataset having 10,000 graphs may use 1,000 seed fragments with 50 distinct labels. On average, each of these 10,000 graphs will have about 20 edges (each seed fragment having about 10 edges). This exemplary dataset can be denoted as D10kI10T20S1kL50.

When the number of distinct labels (L) is large, the synthetic dataset differs greatly from the AIDS antiviral screen dataset. Namely, although local structural similarity appears in different synthetic graphs, there is little similarity existing among each synthetic graph. This characteristic results in a simpler index structure, for example, maxL only needing to be equal to four in order to achieve good performance.

Figure 21:
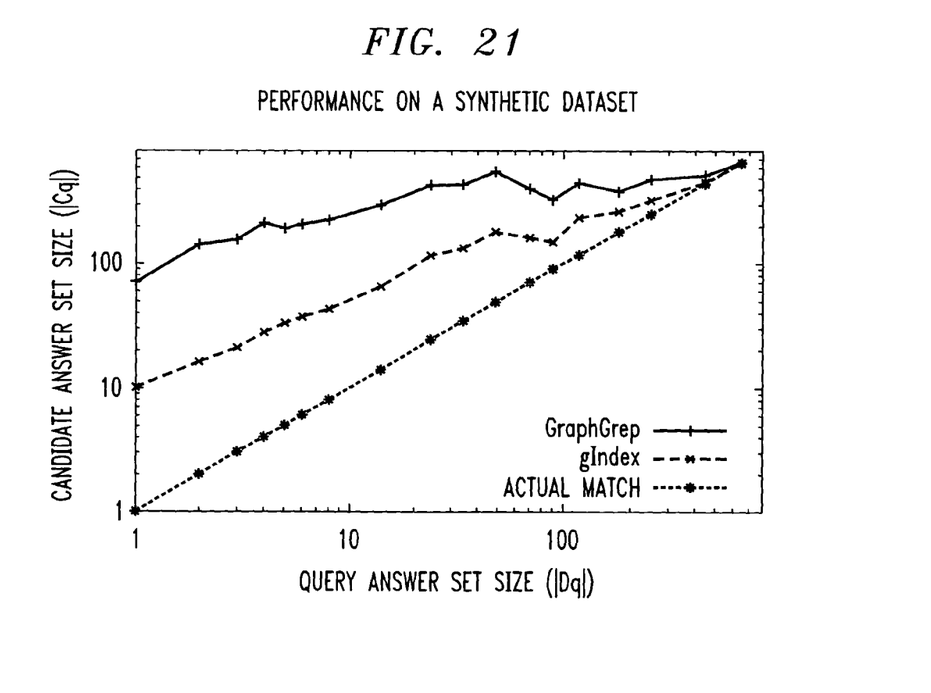
FIG. 21 is a graph illustrating synthetic data query search performance of the present techniques versus a path-based method.

Both GraphGrep and gIndex perform well on such datasets. However, when the number of distinct labels is reduced, the dataset becomes more difficult to index and search. For example, synthetic dataset D10kI10T50S200L4 can be tested with size-12 queries (prepared as described above). The maximum size of paths and subgraphs is set at five for both GraphGrep and gIndex. FIG. 21 illustrates the average size of the candidate answer sets generated with different support queries. As shown in FIG. 21, gIndex performs well as compared to GraphGrep (until $|D_q|$ approaches 300).

Although illustrative embodiments of the present invention have been described herein, it is to be understood that the invention is not limited to those precise embodiments, and that various other changes and modifications may be made by one skilled in the art without departing from the scope or spirit of the invention.

What is claimed is:

1. A method for indexing graphs in a database, the graphs comprising graphic data, the method comprising the steps of:
   identifying frequent subgraphs among one or more of the graphs in the database, the frequent subgraphs appearing in at least a threshold number of the graphs in the database; and
   using one or more of the frequent subgraphs to create an index of the graphs in the database and eliminating one or more redundant frequent subgraphs.

2. The method of claim 1, wherein the step of identifying frequent subgraphs among one or more of the graphs in the database, the frequent subgraphs appearing in at least a threshold number of the graphs in the database further comprises the step of setting the threshold number based on sizes of one or more of the graphs in the database.

3. The method of claim 1, wherein the step of eliminating one or more redundant frequent subgraphs further comprises the step of eliminating one or more of the redundant frequent subgraphs based on size, such that only one subgraph of the one or more redundant frequent subgraphs, having a least number of features, is retained.

4. The method of claim 1, wherein the step of using one or more of the frequent subgraphs to create an index of the graphs in the database further comprises the step of selecting discriminative frequent subgraphs.

5. The method of claim 1, wherein the step of using one or more of the frequent subgraphs to create an index of the graphs in the database further comprises the step of translating one or more of the frequent subgraphs into sequences.

6. The method of claim 5, wherein the step of translating one or more of the frequent subgraphs into sequences further comprises the step of placing the sequences in a prefix tree.

7. The method of claim 1, wherein the step of using one or more of the frequent subgraphs to create an index of the graphs in the database further comprises the step of associating one or more of the frequent subgraphs with an id list, the id list associating the frequent subgraphs with one or more of the graphs in the database.

8. The method of claim 1, wherein the step of using one or more of the frequent subgraphs to create an index of the graphs in the database further comprises the step of mapping one or more of the frequent subgraphs to an edge sequence.

9. The method of claim 8, wherein the step of mapping one or more of the frequent subgraphs to an edge sequence further comprises the step of using the edge sequence to create the index.

10. The method of claim 1, further comprising the step of mapping the index on a tree structure, wherein one or more of the subgraphs represent nodes in the tree structure.

11. The method of claim 10, wherein the step of mapping the index on a tree structure, wherein one or more of the subgraphs represent nodes in the tree structure further comprises the step of mapping the index on the tree structure, wherein one or more of the subgraphs comprise discriminative subgraphs.

12. The method of claim 10, wherein the step of mapping the index on a tree structure, wherein one or more of the subgraphs represent nodes in the tree structure further comprises the step of mapping the index on the tree structure, wherein one or more of the subgraphs comprise redundant subgraphs.

13. The method of claim 1, further comprising the step of comparing a query graph with one or more of the graphs in the database using the index.

14. The method of claim 13, further comprising the step of identifying one or more discriminative subgraphs within the query graph, the one or more discriminative subgraphs each being unique among all other subgraphs present in the query graph.

15. The method of claim 13, further comprising the step of verifying matches between the query graph and one or more of the graphs in the database.

16. The method of claim 1, wherein the step of using one or more of the frequent subgraphs to create an index of the graphs in the database further comprises the step of updating the index in response to one or more graphs being added to the database.

17. The method of claim 1, wherein the step of using one or more of the frequent subgraphs to create an index of the graphs in the database further comprises the step of updating the index in response to one or more graphs being deleted from the database.

18. An apparatus for indexing graphs in a database, the graphs comprising graphic data, the apparatus comprising:
   a memory; and
   at least one processor, coupled to the memory, operative to:
   identify frequent subgraphs among one or more of the graphs in the database, the frequent subgraphs appearing in at least a threshold number of the graphs in the database; and
   use one or more of the frequent subgraphs to create an index of the graphs in the database and eliminate one or more redundant frequent subgraphs.

19. An article of manufacture for indexing graphs in a database, the graphs comprising graphic data, comprising a non-transitory machine readable medium containing one or more programs which when executed implement the steps of:
   identifying frequent subgraphs among one or more of the graphs in the database, the frequent subgraphs appearing in at least a threshold number of the graphs in the database; and
   using one or more of the frequent subgraphs to create an index of the graphs in the database and eliminating one or more redundant frequent subgraphs.

20. A method of processing a graph query, the method comprising the following steps:
   obtaining an index of graphs in a database by the steps of:
      identifying frequent subgraphs among one or more of the graphs in the database, the frequent subgraphs appearing in at least a threshold number of the graphs in the database;
      using one or more of the frequent subgraphs to create the index of the graphs in the database and eliminating one or more redundant frequent subgraphs; and
   comparing said query graph with one or more of the graphs in the database using the index.

* * * * *